United States Patent [19]

Remboski, Jr. et al.

[11] Patent Number: 5,515,720

[45] Date of Patent: May 14, 1996

[54] ACCELERATION BASED MISFIRE DETECTION SYSTEM AND METHOD WITH IMPROVED SIGNAL FIDELITY

[75] Inventors: Donald J. Remboski, Jr., Dearborn; Steven L. Plee, Brighton; Marvin L. Lynch, Detroit; Michael A. McClish, Northville; Susan K. Sonday, Dearborn, all of Mich.

[73] Assignee: Motorola, Inc., Schaumburg, Ill.

[21] Appl. No.: 279,966

[22] Filed: Jul. 25, 1994

[51] Int. Cl.$^6$ .................. G01M 15/00; G06F 15/50; F02P 5/14

[52] U.S. Cl. ............... 73/116; 73/117.3; 364/431.07

[58] Field of Search .................... 73/116, 117.2, 73/117.3; 364/431.07, 431.08

[56] References Cited

U.S. PATENT DOCUMENTS

| | | | |
|---|---|---|---|
| 5,044,194 | 9/1991 | James et al. | 73/117.3 |
| 5,088,318 | 2/1992 | Osawa | 73/117.3 |
| 5,105,372 | 4/1992 | Provost et al. | 73/116 |
| 5,109,695 | 5/1992 | James et al. | |
| 5,125,381 | 6/1992 | Nutton et al. | |
| 5,239,473 | 8/1993 | Ribbens et al. | |
| 5,263,453 | 11/1993 | Wakahara et al. | 73/117.3 |
| 5,278,760 | 1/1994 | Ribbens et al. | |
| 5,303,158 | 4/1994 | Kuroda | 73/117.3 |
| 5,307,670 | 5/1994 | Imai et al. | 73/117.3 |
| 5,357,790 | 10/1994 | Hosoya | 73/117.3 |
| 5,379,634 | 1/1995 | Kuroda et al. | 73/116 |
| 5,387,253 | 2/1995 | Remboski et al. | 73/117.3 |
| 5,390,537 | 2/1995 | Kuroda et al. | 73/117.3 |

Primary Examiner—Kenneth A. Wieder
Assistant Examiner—George M. Dombroske
Attorney, Agent, or Firm—Nicholas C. Hopman

[57] ABSTRACT

An acceleration based misfire detection system with improved signal fidelity comprises a measurement device (421, 423, 425, 427) for determining an operating condition of the powertrain (401). The operating condition can include engine speed, engine load, as well as other conditions. A misfire detector (417) provides a misfire indication (419) dependent on an improved fidelity acceleration signal (415). The improved fidelity acceleration signal (415) is provided by either a median filter (413) operating on an acceleration signal (411) where the median filter's rank is programmable dependent on the determined operating condition of the powertrain, a highpass filter operating on an acceleration signal (411) where the highpass filter's order is programmable dependent on the determined operating condition of the powertrain, or from an acceleration determination device (409) acting on velocity information provided by a lowpass filter (407) operating on a velocity signal (406) where the lowpass filter's order is programmable dependent on the determined operating condition of the powertrain, or a combination of the above.

37 Claims, 4 Drawing Sheets

ACCELERATION BASED MISFIRE DETECTION SYSTEM AND METHOD WITH IMPROVED SIGNAL FIDELITY

FIELD OF THE INVENTION

This invention is generally directed to the field of engine controls, and specifically to a signal processing system and method for detecting a misfiring condition in a reciprocating engine.

BACKGROUND OF THE INVENTION

Many contemporary engine controls have integral misfire detection systems. With ever-increasingly more stringent emissions standards, the assurance of accurate and complete misfire detection under all engine and vehicular operating conditions is becoming mandatory.

Commonly, system designers rely on measurement of crankshaft engine angular velocity, and sometimes crankshaft or other forms of, engine acceleration, both dependent largely on engine torque produced during a combustion process to determine misfiring of a particular engine cylinder. Given the velocity or acceleration information, misfires are predicted by various signature analysis, and/or spectral analysis, methods.

As a practical matter the engine angular velocity and acceleration behavior is also affected by powertrain related behaviors other than firing torque. These other behaviors can significantly reduce fidelity or signal-noise ratio of the primarily firing torque related velocity or acceleration signal under analysis. Furthermore, under some engine operating conditions, the noise exceeds the primarily engine torque related velocity or acceleration signal under analysis. Moreover, the noise related behavior is not limited to engine operation only causes, but include behaviors related to the complete driveline. Some noise related behaviors that are detrimental include driveline resonance effects, or vibrations, excited at least partially by cylinder misfiring, torque converter lockup, low speed lugging behavior characteristic of a manual transmission, a change in transmission gears and rough road conditions. Each of these, and other sources of stimulus, excite the driveline to perturbate, or transiently oscillate, at its resonant frequency.

When the above-mentioned driveline behaviors manifest themselves and the driveline oscillates a significant measure of what amounts to noise, relative to the misfire induced behavior, is introduced into the velocity or acceleration measurement. This noise can largely swamp out any signatory behavior of a misfire event—particularly with a non-compliant coupling between the engine and the transmission.

FIG. 1 shows a 1st portion 101 of a waveform indicative of acceleration of an engine's crankshaft due to a properly firing cylinder, firing in a sequence of several cylinders, and a 2nd portion 103 waveform indicative of acceleration of an engine's crankshaft due to a misfiring cylinder later in the sequence of firing cylinders. Of note, at reference number 103 the engine's crankshaft grossly decels because proper firing did not occur and therefore the cylinder did not add the expected torque to the crankshaft as it did at reference number 101. Note that his is a theoretical representation of the acceleration effect. If the actual behavior produced by the engine crankshaft is that shown in FIG. 1 then a comparison process can monitor the behavior at a predetermined threshold 105 and indicate a misfiring condition if the waveform goes below the threshold.

FIG. 2 illustrates a behavior of an actual acceleration signal 201 derived from a running engine over about 150 cylinder combustion cycles. This acceleration signal 201 includes a repetitively induced misfire by periodically removing a spark signal from one cylinder. So, in a real-world application the signal derived from a running engine is effected by other than combustion related torque as earlier mentioned. For reference purposes, the tick lines 203 on the horizontal axis demarcate the deliberately induced occurrences of misfire. The waveform 201 is derived using an acceleration sensing device coupled to the engine's crankshaft. Because of crankshaft torsional vibrations, inertial torque due to reciprocating masses, and other mechanically induced vibrations on the engine's crankshaft, the waveform shown in FIG. 2 has poor fidelity and therefore the acceleration signal related to the misfire cannot be clearly seen and thereby detected as discussed in FIG. 1. Additionally, the above-mentioned driveline resonance effects are also represented in the subject waveform in FIG. 2 and significantly reduce the fidelity of the signal making detection by a simple threshold detection scheme hopeless.

One prior art scheme averages the engine acceleration waveform to improve the fidelity by eliminating cylinder-to-cylinder variability at least partially influenced by engine related vibrations. However, these fixed averaging schemes perform inadequately over all engine operating conditions—particularly at high engine speeds and light engine loads.

Another prior art scheme applies a chassis mounted accelerometer to predict driveline vibrations characteristic of a subset of the above-mentioned behaviors. Accordingly, if one of these behaviors is sensed the misfire detection scheme is disabled. This prevents false detection of what appears to emulate a misfire but is in fact a driveline perturbation caused by, for instance, a rough road condition. Of course this scheme will also fail to detect misfires occurring during this disabling process. Abdication to predict meaningful misfires aside, this scheme is complex, unreliable, difficult to manufacture, and very costly because it adds another sensor and its associated supporting wiring, electrical interface, and signal conditioning circuitry.

Another scheme employs a fixed rank median filter to determine gross, or average, acceleration of an engine which is then used to filter-out certain transient effects. This scheme lacks the ability to adapt to a wide variety of driveline vibrations caused by various sources of stimulation, not insignificantly misfire induced driveline vibrations, as described above. As in the former scheme, this scheme includes recognition of poor acceleration signal fidelity and disables the misfire detection mechanism when the fidelity is poor. Accordingly, the known prior art only detects a subset of misfiring conditions. This is unacceptable with the strict legislation proposed.

What is needed is an improved approach for misfire detection particularly one that is insensitive to averse powertrain operating effects. In particular, an improved system needs to account for crankshaft torsional vibrations, inertial torque due to reciprocating masses, other mechanically induced vibrations on the engine's crankshaft, and driveline perturbations over a wide range of engine operating conditions.

DETAILED DESCRIPTION OF A PREFERRED EMBODIMENT

An acceleration based misfire detection system with improved signal fidelity comprises a measurement device for determining an operating condition of the powertrain. The operating condition can include engine speed, engine load, as well as other conditions. A misfire detector provides a misfire indication dependent on an improved fidelity acceleration signal. The improved fidelity acceleration signal is provided by either a median filter operating on an acceleration signal where the median filter's rank is programmable dependent on the determined operating condition of the powertrain, a highpass filter operating on an acceleration signal where the highpass filter's order is programmable dependent on the determined operating condition of the powertrain, or from an acceleration determination device acting on velocity information provided by a lowpass filter operating on a velocity signal where the lowpass filter's order is programmable dependent on the determined operating condition of the powertrain, or a combination of the above.

A problem with prior art systems is poor signal fidelity. The invention described in the preferred embodiment significantly improves signal fidelity. In short the earlier-described engine and driveline vibrations will be filtered out under a wide variety of engine operating conditions thereby significantly improving the acceleration signal fidelity and making reliable and accurate misfire detection possible over those wide range of engine operating conditions.

Figure 1:
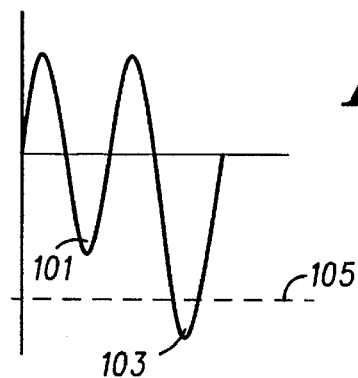
FIG. 1 is a chart showing a theoretical acceleration waveform representing engine torque and illustrates the effects of proper firing and misfiring.
Figure 2:
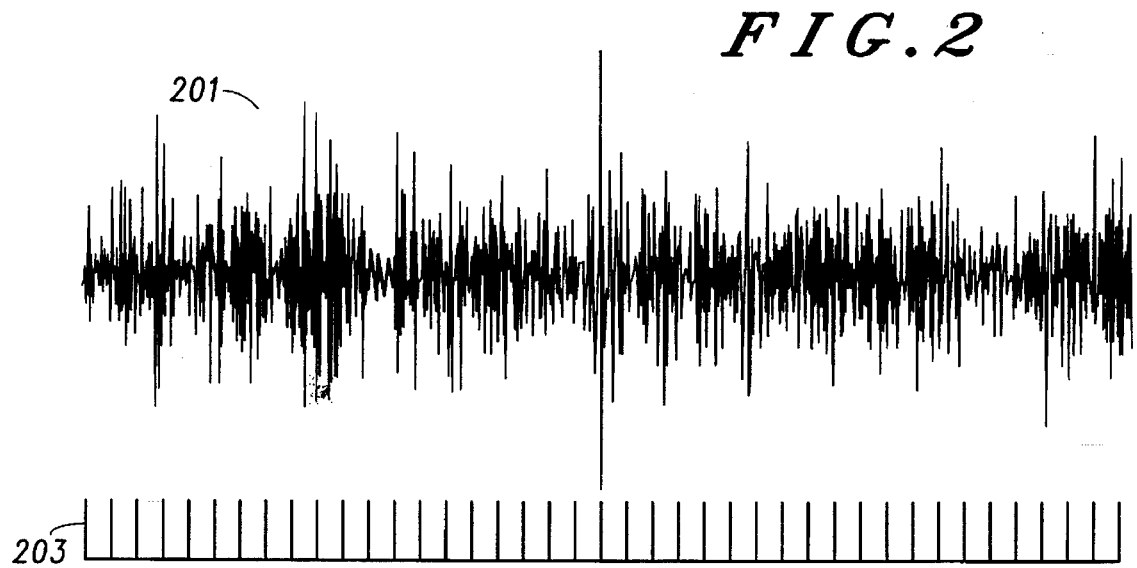
FIG. 2 is a chart showing an engine acceleration waveform from an actual engine running at 5,000 RPM under a light load illustrating effects of high frequency noise due to crankshaft torsional vibrations, inertial torque due to reciprocating masses, other mechanically induced vibrations on the engine's crankshaft, and driveline perturbations.

FIG. 1 and FIG. 2, are charts showing engine acceleration waveform illustrating respectively theoretical and actual behavioral effects of cylinder firing and misfiring as detailed in the Background section.

As mentioned in the Background engine acceleration behavior can be used to analyze misfire behavior. Unfortunately, behaviors associated with mechanical structural relationships in the engine and associated driveline can add noise which significantly reduces fidelity or signal-noise ratio of the, primarily engine torque related, acceleration signal to be analyzed. Also mentioned, under some engine operating conditions, the noise exceeds the primarily engine torque related acceleration signal under analysis.

Some noise related behaviors that are detrimental include, engine related effects such as crankshaft torsional vibrations, inertial torque due to reciprocating masses, and other mechanically induced vibrations on the engine's crankshaft add noise to the acceleration measurement and thereby reduce the fidelity of the signal/waveform measured. Additionally, driveline resonance effects, or vibrations, excited at least partially by cylinder misfiring, torque converter lockup, low speed lugging behavior characteristic of a manual transmission, a change in transmission gears and rough road conditions. Each of these, and other sources of stimulus, excite the driveline to perturbate, or transiently oscillate, at its resonant frequency. Furthermore, inventors' experimentation has borne that the resonant frequency of the driveline is at least partially dependent on a compliancy of a coupling between the engine and a transmission. This compliancy often largely determines a magnitude and frequency of the driveline vibration behavior. Typically, the less compliant the coupling the greater the magnitude and the more proximate the frequency of oscillation is to the spectral behavior directly caused by misfire on an acceleration measurement. Because of the varied coupling compliancy between the engine and the transmission, and the various sources of driveline stimulation, the magnitude, duration, and frequency of driveline vibrations are variable over various engine operating conditions not least of which include engine speed, engine load, and transmission gear selection.

In conclusion, not only have the inventors observed that the engine acceleration behavior's signal fidelity changes over a wide range of engine operating conditions but that the fidelity may change significantly as mechanical structural relationships in the engine and associated driveline change.

As mentioned in the background section earlier schemes did average or filter engine acceleration waveforms but their performance was inadequate over all engine operating conditions—particularly at high engine speeds and light engine loads. This is because the difference in amplitude between acceleration behavior due to proper firing and misfiring under light engine load and high engine speed is minimal. Therefore, the inferior fidelity of these prior art schemes obscures the detection of misfire. Also, as mentioned in the background section still other schemes employ a median filter to eliminate driveline perturbation effects. Similarly, these schemes also fail to improve the acceleration waveform fidelity over all engine and driveline operating conditions and therefore are inadequate to accurately detect misfire. To more clearly appreciate the effects of the various detrimental engine and driveline related causes a chart showing crankshaft spectral behavior will be detailed next.

Figure 3:
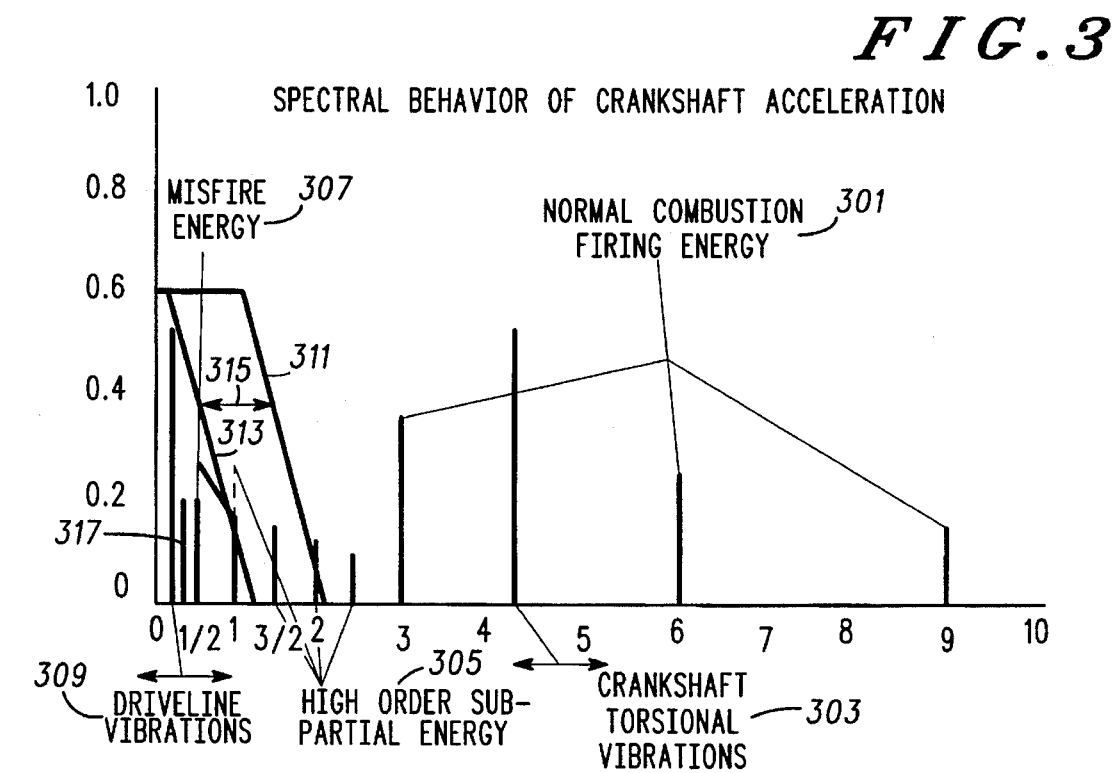
FIG. 3 is a chart illustrating various spectral behavior characteristic of engine acceleration due to normal combustion torque, torque due to reciprocating masses, misfiring, torsional vibrations, high-order sub-partials, and driveline vibrations in terms of engine cycles/revolution for a 6-cylinder 4-stroke engine.

FIG. 3 is a chart illustrating various spectral behavior characteristic of engine acceleration due to normal combustion torque, torque due to reciprocating masses, misfiring, torsional vibrations, high-order sub-partials, and driveline vibrations for a 6 cylinder 4-stroke reciprocating engine in terms of engine cycles/revolution. Normal combustion firing torque, and torque due to reciprocating masses 301 manifests itself at 3, 6, and 9 cycles/revolution. A torsional vibration 303 characteristic of the natural frequency of oscillation of the crankshaft occurs with a substantial magnitude above 3 cycles/revolution. Furthermore, the crankshaft torsional vibration moves in order, here measured in cycles/revolution, with engine speed. High-order sub-partial energy 305 occurring at 1 cycle/revolution to 3 cycles/revolution is indicative of vibrations due to encoder (the encoder that is used to measure crankshaft angular velocity) profile errors, and piston imbalance. Misfire induced energy 307 is indicative of a coil-pack failure at 1 cycle/revolution (since 3 of 6 cylinders normally fires/revolution), or a hard failure of one cylinder at ½ cycle/revolution (since each cylinder normally fires every 2 revolutions). Intermittent misfire frequencies 317 are below ½ cycle/revolution. Their specific position on the chart will be determined by their periodicity. Driveline vibrations 309, at least partially caused by cylinder misfiring, torque converter lockup, low speed lugging behavior characteristic of a manual transmission, a change in transmission gears and rough road conditions, occur at a characteristically low order, are relatively strong in magnitude, shift around in order, and are positioned precariously proximate the energy associated with misfire.

In particular it is the first order (1 cycle/revolution) behavior associated with vibrations due to encoder profile errors, piston imbalance, and the precariously proximate order of the driveline vibrations that make it difficult at best to determine a misfiring condition in a reciprocating engine. Furthermore, through experimentation, it has been found that the behavior of these closely proximate sources of error varies significantly in order due to driveline vibrations and magnitude due to driveline vibrations and various engine operating conditions including engine speed, engine load, and engine-transmission coupling compliancy. To improve the fidelity of the acceleration waveform shown in FIG. 2A system and corresponding method will be detailed next. As mentioned above the earlier-described averse powertrain behavior (engine and driveline vibrations) will be filtered out under a wide variety of engine operating conditions thereby significantly improving the acceleration signal fidelity and making reliable and accurate misfire detection possible over those wide range of engine operating conditions.

Figure 4:
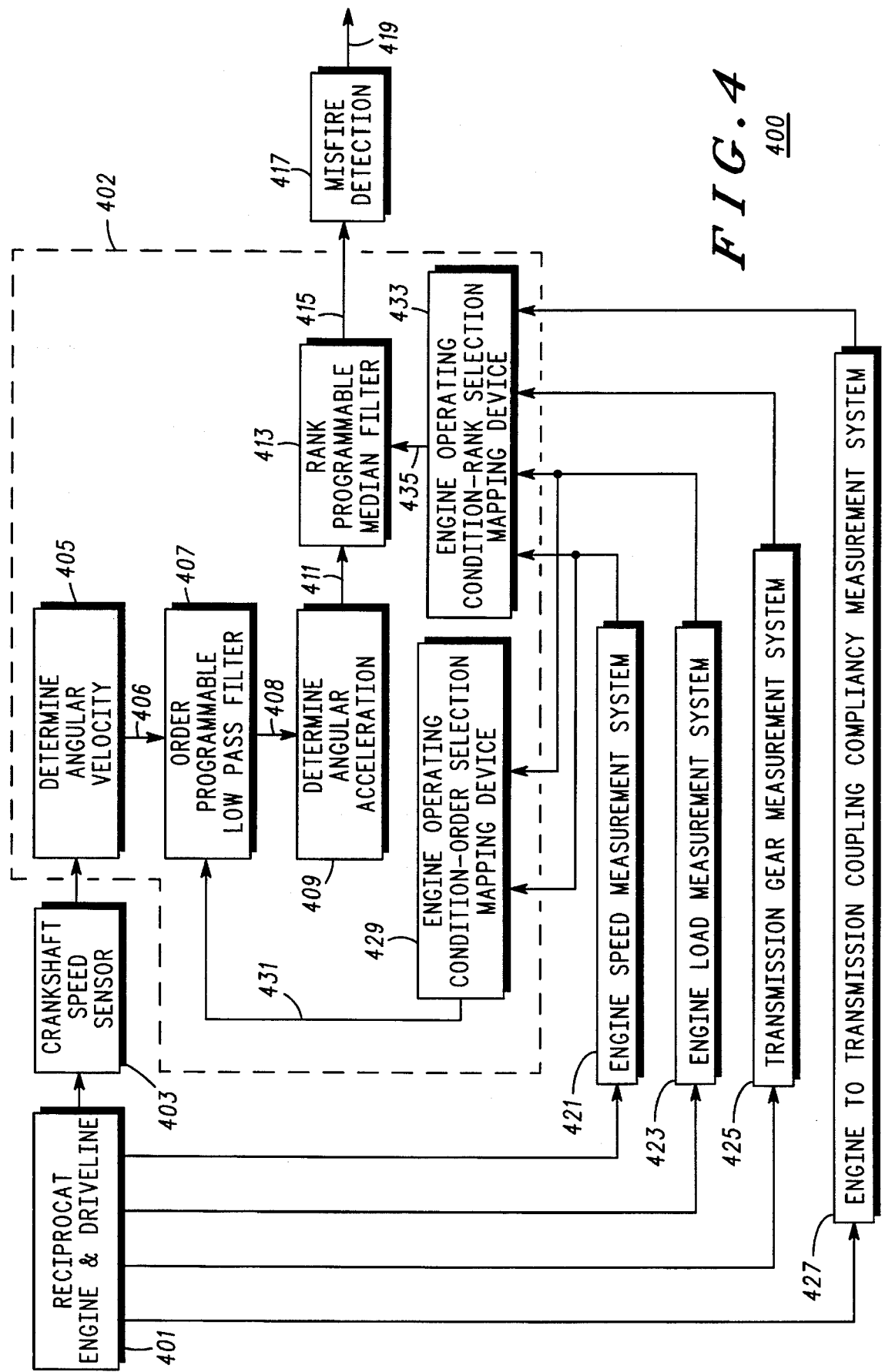
FIG. 4 is a system block diagram illustrating a misfire detection system including system for improving signal fidelity in accordance with a preferred embodiment of the invention.

In FIG. 4, a system block diagram illustrates a misfire detection system 400 including system for filming out the averse effects of, extraneous engine vibrations and driveline vibrations, in accordance with a preferred embodiment of the invention. This system 400 is used to detect a misfiring condition using engine acceleration as a metric of combustion performance. Furthermore, it has the capability of significantly improving acceleration signal fidelity through a structure including two programmable filters. Preferably, these are programmable digital filters that are programmed in response to powertrain operating conditions and are configured dynamically as the powertrain operating conditions change.

A reciprocating engine and driveline 401 represents the aforementioned powertrain. Preferably, the driveline includes an engine, an engine-transmission coupling, a transmission coupled to a driveshaft, coupled to an axle, coupled to vehicular drive wheels. However in nonvehicular, for instance stationary, applications the exact configuration of the driveline may be different.

A crankshaft sensor 403 is coupled to the engine and is used to measure angular displacement and speed of the engine's crankshaft by sensing teeth on a toothed wheel mounted on the crankshaft.

In the preferred embodiment elements imbedded within an area demarked by reference number 402 are emulated in a digital hardwired circuit on an ASIC (Application Specific Integrated Circuit). This digital circuit 402 responsive to the crankshaft speed sensor 403 operates continuously on a discrete stream of data. Alternatively, these elements may be emulated in microcoded software executed on a digital signal processor or DSP. For instance a Motorola DSP56001 device may be used. Of course, those skilled in the art will recognize other equivalently useful hardwired, software emulated, and DSP approaches to perform the intended function of this area 402 of the system block diagram.

In system block 405 a signal derived from the crankshaft sensor 403 is used to derive angular velocity of the engine's crankshaft dependent on a known angular spacing of the teeth on the toothed wheel, and a time measured between the teeth. A signal 406 provided by block 405 is a discrete time sampled representation of the derived velocity.

In system block 407, an order programmable lowpass filter, is used to attenuate the crankshaft torsional vibrations, inertial torque due to reciprocating masses, and other mechanically induced vibrations on the engine's crankshaft and normal combustion from the misfire energy which occurs at 1.0 cycle/revolution or less introduced in FIG. 3, and to provide a lowpass filtered velocity signal 408. Note that although the programmable lowpass filter is shown to filter a velocity signal before determination of acceleration, it may also act directly on an acceleration signal. Preferably, the programmable lowpass filter 407 is configured to operate in the cycles/revolution domain because the misfire related energy 307 is stationary in the cycles/revolution domain over various engine speeds, making the control of the lowpass filter order simple. Alternatively, the programmable lowpass filter 407 can be configured to operate in another domain—such as the time domain. The programmable lowpass filter's 407 order selection is controlled by system block 429, which is described later. The programmable lowpass filter's 407 order can be made variable as a function of engine speed and load to improve signal fidelity so that misfire detection capability can be enhanced. Details of how this programmable lowpass filter 407 order is programmed will be detailed below.

In system block 409, a continuous time sampled acceleration signal 411 is derived from the lowpass filtered velocity signal 408. The lowpass filtered acceleration signal 411 is provided to a programmable median filter 413. The programmable median filter 413 performs a nonlinear filter function, similar to that of a highpass filter, to remove low frequency driveline vibrations (see FIG. 3 reference number 309). By altering the rank of the programmable median filter 413 the order variation of the low frequency driveline vibrations can be accounted for— thereby improving signal fidelity. Optimally, the rank of the median filter is chosen to match a period of monotonicity in the acceleration signal. As benefit of applying this observation, the median filter can mask or filter out the driveline oscillatory vibrations corresponding to this period of monotonicity. This in-effect will serve the function of a traditional highpass filter. Although a traditional highpass filter will work it is less desirable because of the complexity required to match the performance of the median filter. The programmable median filter 413 provides an improved fidelity median filtered signal 415 to be used to detect misfire. The programmable median filter 413 works as follows.

A continuous list of acceleration data having a variable number of data samples "n", derived from the lowpass filtered acceleration signal 411, is sorted to select a particular data sample that has a magnitude median within the list of data samples. The number of data samples "n" of the list is considered the rank of the programmable median filter 413. Next, the acceleration data corresponding to the sample having the median magnitude is then subtracted from an acceleration data value at the center of the unsorted continuous list. For example:

There are 5 continuous unsorted data samples:

TABLE 1

| |
|---|
| S1 = 20 |
| S2 = 15 |
| S3 = 30 |
| S4 = 50 |
| S5 = 10 |

From this list the rank, or length of the list is five, the median value of the five samples is twenty, and the median filtered value (signal) 415 of the center sample (S3) is 30−20=10.

The programmable median filter's 413 order selection is controlled by system block 433, which is detailed later. The rank of the programmable median filter 413 can be made to be variable dependent on engine load, engine speed, transmission gear to improve misfire detection. Additionally, the rank of the programmable median filter 413 can be made to be variable dependent on engine-transmission coupling, to improve misfire detection capability during torque converter lockup, low speed lugging and rough road conditions. Note that at high engine speeds, it may be beneficial to completely disable the programmable median filter 413.

An engine speed measurement system 421 derives engine speed. This is preferably accomplished by using the crankshaft sensor 403 described above.

An engine load measurement system 423 derives engine load either by determining mass air flow of the engine, or alternatively by combining a measurement of manifold absolute pressure and engine speed.

A transmission gear measurement system 425 derives transmission gear by monitoring a transmission provided signal indicative of transmission gear. Also, a lockup state of the transmission is determined by the engine to transmission coupling compliancy measurement system 27 from a similar signal provided from the transmission. The transmission coupling compliancy measurement system 427 also indicates the type, either manual or automatic, transmission coupled to the engine. The above-mentioned block 429 is an engine operating condition-order selection mapping device which stores filter coefficients 431 to be provided to the order programmable lowpass filter 407, as a function of engine speed and engine load provided by the engine speed measurement system 421 and the engine load measurement system 423 respectively. Details of the filter order associated with the coefficients and their dependency on engine speed and load will be detailed later in the discussion of FIG. 6.

The above-mentioned block 433 is an engine operating condition-rank selection mapping device which stores filter rank 435 to be provided to the programmable median filter 413, as a function of engine speed, engine load, transmission gear, and engine-transmission coupling compliancy provided by the above described systems 421, 423, 425, and 427. Details of the filter rank selected will be detailed later in the discussion of FIG. 6.

A misfire detection block 417 uses the improved fidelity median filtered signal 415 to determine a misfiring condition, indicated by signal 419, by comparing the improved fidelity median filtered signal 415 with a calibrated threshold.

Now that the improved signal fidelity misfire signal detection has been detailed, several working examples will be introduced to illustrate the advantages of the system.

Figure 5:
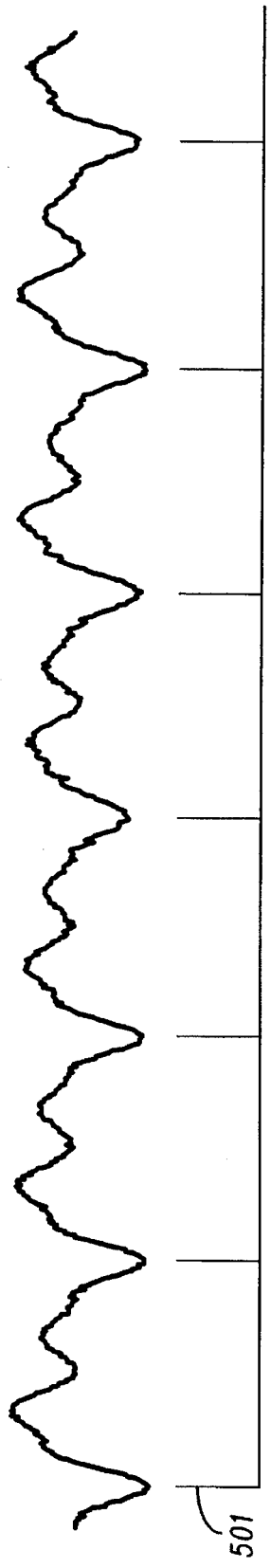
FIG. 5 is a chart illustrating an engine acceleration waveform corresponding to the waveform shown in FIG. 2 with associated with a 0.01 order lowpass filter.

A first example of the improved system and method addresses a steady-state engine operating condition represented originally in FIG. 2 which shows an engine acceleration waveform from an actual engine running at 5,000 RPM under a light load. In this example only the portion representative of the effects of high frequency noise due to crankshaft torsional vibrations, inertial torque due to reciprocating masses, other mechanically induced vibrations on the engine's crankshaft is addressed. Specifically, at high engine speeds vibrations due to encoder profile error, and piston imbalance produce substantial interference at 1.0 cycle/revolution. Under the just-mentioned operating conditions, a lower order filter is used to maintain good 1/n and intermittent misfire detection capability at the expense of 2/n misfire detection capability, where n-number of cylinders in the engine. To eliminate the effect of the just-mentioned high-frequency noise, the order programmable lowpass filter 407 shown in FIG. 4 is programmed to respond at 0.01 cycles/revolution. Referring back to FIG. 3 this result can be seen at reference number 313. It can be clearly seen that by reducing the order of the order programmable lowpass filter 407 that the torsional vibration 303, the normal combustion firing torque, and torque due to reciprocating masses 301 occurring at 3, 6, and 9 cycles/revolution, and the high-order sub-partial energy 305 occurring at 1 cycle/revolution to 3 cycles/revolution are eliminated from the waveform shown in FIG. 2. The beneficial result is shown in the waveform of FIG. 5 in terms of acceleration. Note the clearly distinct occurrences of misfire behavior shown demarcated by the tick marks on the horizontal scale 501 which indicates the position of the periodically induced misfires. Using this improved waveform accurate misfire detection becomes possible.

Figure 6:
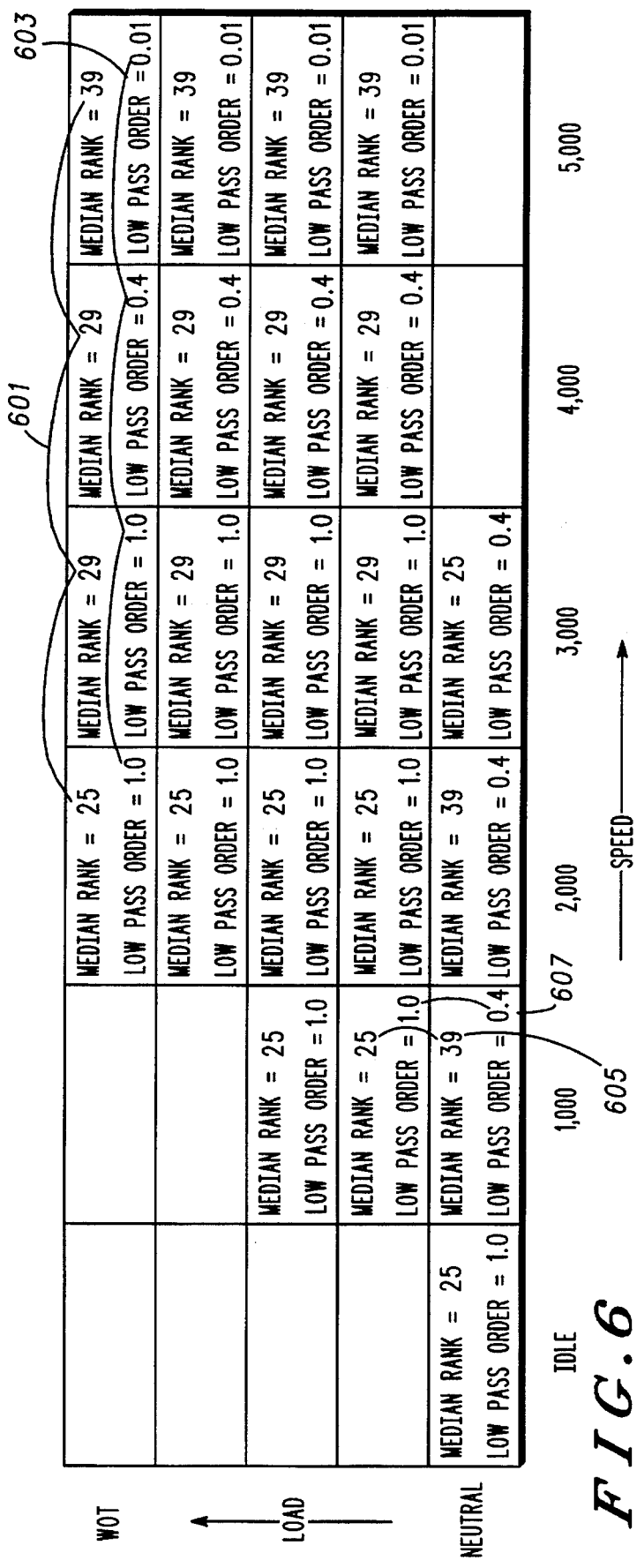
FIG. 6 is a mapping selection chart that illustrates various rank and order selection parameters associated with the system shown in FIG. 4.

The order programmable lowpass filter approach can also address and improve fidelity of the acceleration signal over a wide range of engine operating conditions. Some of these are shown in FIG. 6. Specifically, the chart in FIG. 6 shows various lowpass filter order and also median filter rank calibrations over a range of engine operating conditions in terms of engine speed and engine load. In most cases it is desirable to use a 1st order lowpass filter shown at reference number 311 to avoid losing 2/n misfire detection capability. At high engine speeds, as shown previously in FIG. 5, 2/n misfire detection capability must be sacrificed to maintain intermittent and 1/n capability because of an increased amplitude of high-order sub-partial energy at 1.0 cycle/revolution.

Other examples of filter (both lowpass and median filter) programming are shown in FIG. 6. In this case, it is desirable to vary lowpass filter order and median filter rank as shown below to maintain adequate misfire detection capability over the engine speed/load map.

For instance, reference number 601 shows that as engine speed increases, the median filter rank needs to increase to maintain good signal fidelity. Reference number 603 shows that as engine speed increases, the lowpass filter order needs to decrease to maintain good signal fidelity. Also, reference number 605 shows that as engine load increases, the median filter rank needs to decrease to maintain good signal fidelity, and reference number 607 shows that as engine load increases, the lowpass filter order needs to increase to maintain good signal fidelity.

Beneficially, using the above-described approach, the order and rank selection mapping can be optimized differently for different engine families. Furthermore, under light engine loading conditions, such as when the transmission is in neutral the programmable median filter may be disabled in some engine families.

Figure 7:
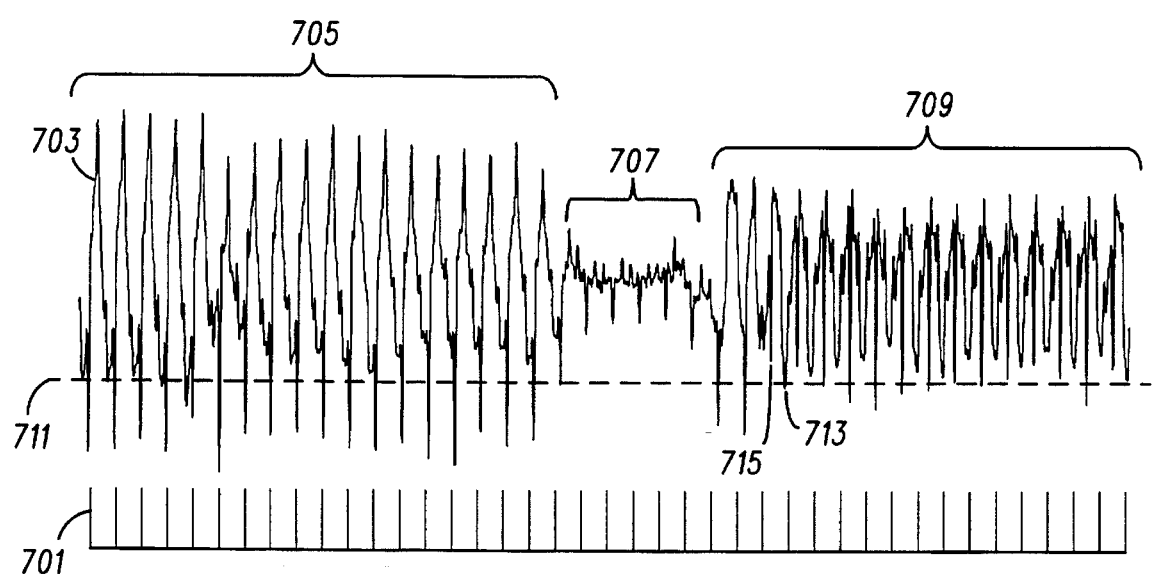
FIG. 7 is a chart showing an engine acceleration waveform illustrating effects of misfiring and driveline vibrations while a powertrain is powering a vehicle accelerating from zero to fifty-five miles per hour while shifting between an automatic transmission's third and fourth gear.

FIG. 7 illustrates the acceleration signal output for a vehicle with an automatic transmission shifting transmission gears from 3rd to 4th. A first portion 705 of the waveform 703 represents the reciprocating engine's crankshaft acceleration while the automatic transmission is operating in 3rd gear. Note that the tick marks on the horizontal scale shown at reference number 701 demarcate the position of the periodically induced misfires. A second portion 707 of the waveform 703 represents the reciprocating engine's crankshaft acceleration while the automatic transmission is operating in neutral, and a third portion 709 of the waveform 703 represents acceleration behavior of the reciprocating engine's crankshaft while the transmission is operating in 4th gear. In a typical misfire detection scheme the acceleration waveform 703 is compared to a threshold, here shown at reference number 711, to detect misfire. Once the acceleration waveform is lower than this threshold 711 a misfire is indicated. Because of the relatively poor fidelity, or signal to noise ratio, of this waveform 703, it can be seen that misfires may be incorrectly indicated when compared to the set threshold 711. In some cases, as illustrated by reference number 713 a magnitude of the noise exceeds a magnitude of the acceleration signal 715. So to reliably detect misfire the fidelity of the acceleration signal needs to be improved prior to the comparison operation.

Figure 8:
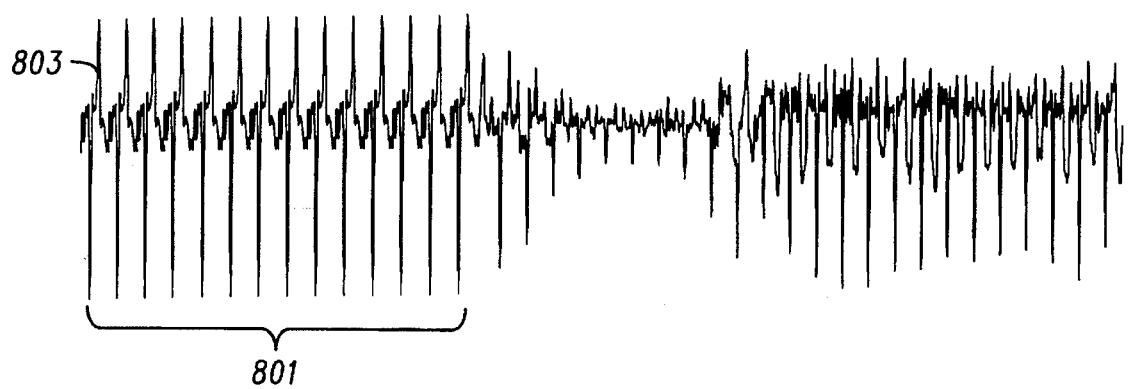
FIG. 8 is a chart illustrating an engine acceleration waveform corresponding to the waveform shown in FIG. 7 with driveline vibrations reduced, particularly while the powertrain is operating with a transmission in 3rd gear, by a variable rank median filter.
Figure 9:
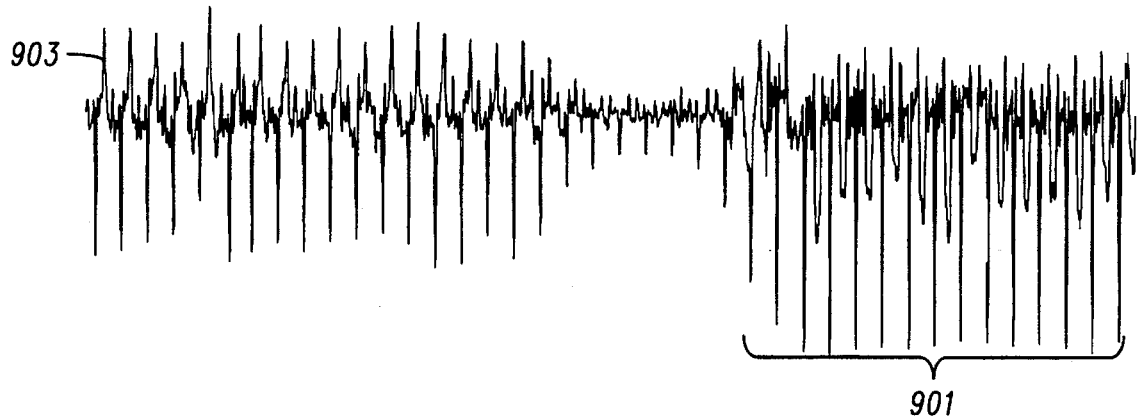
FIG. 9 is a chart illustrating an engine acceleration waveform corresponding to the waveform shown in FIG. 7 with driveline vibrations reduced, particularly while the powertrain is operating with a transmission in 4th gear, by a variable rank median filter.

FIGS. 8 and 9 illustrate results of various median filter rank calibrations that reduce unwanted noise at the lower frequencies characteristic of driveline vibration which vary with engine speed, and other effects described above.

A portion 801 of the waveform 803, which represents a median filtered version of the waveform 703 over the portion 705 shows the improved fidelity resulting from the application of a rank 61 median filter.

A portion 901 of the waveform 903, which represents a median filtered version of the waveform 703 over the portion 709 shows the improved fidelity resulting from the application of a rank 29 median filter. Note that the reason for selecting different ranks for the different transmission gears is to optimize the fidelity of the processed acceleration signal under the different engine operating conditions.

In conclusion, by applying the above-described approach a significant improvement in the fidelity of the signal representative of the engine acceleration can be achieved. This includes improving signal fidelity over a wide dynamic range according to engine and driveline related variable magnitude, duration, and frequency vibrations. Because of this misfires can be detected over a much broader range of vehicular operating conditions than prior art systems.

What is claimed is:

1. An acceleration based misfire detection system with improved signal fidelity comprising:

velocity measurement means for providing a velocity signal indicative of velocity behavior of the reciprocating engine;

means for determining the reciprocating engine's load; and filtering means programmable dependent on the reciprocating engine's load, the filtering means for providing a filtered velocity signal responsive to the velocity signal provided by the velocity measurement means; and acceleration determination means for providing a filtered acceleration signal dependent on the filtered velocity signal.

2. A system in accordance with claim 1 wherein the filtering means comprises an order programmable lowpass filter, and wherein the order of the order programmable lowpass filter is programmed dependent on the reciprocating engine's load determined by the means for determining the reciprocating engine's load.

3. A system in accordance with claim 2 further comprising reciprocating engine speed determination means and wherein the order of the order programmable lowpass filter is programmed dependent on reciprocating engine speed determined by the reciprocating engine speed determination means.

4. A system in accordance with claim 1 further comprising misfire determination means for receiving the filtered acceleration signal and for providing a misfire indication dependent thereon.

5. An acceleration based misfire detection system with improved signal fidelity comprising:

acceleration measurement means for providing an acceleration signal indicative of acceleration behavior of the reciprocating engine;

means for determining the reciprocating engine's speed; and highpass filtering means having an order programmable dependent on the reciprocating engine's speed, the highpass filtering means for providing a filtered acceleration signal responsive to the acceleration signal provided by the acceleration measurement means.

6. A system in accordance with claim 5 further comprising misfire determination means for receiving the filtered acceleration signal and for providing a misfire indication dependent thereon.

7. An acceleration based misfire detection system with improved signal fidelity comprising:

acceleration measurement means for providing an acceleration signal indicative of acceleration behavior of the reciprocating engine;

means for determining an operating condition of the reciprocating engine; and programmable median filter means having a rank programmable dependent on the determined operating condition of the reciprocating engine, the programmable median filter means for providing a filtered acceleration signal responsive to the acceleration signal provided by the acceleration measurement means.

8. A system in accordance with claim 7 wherein the programmable median filter means comprises:

means for extracting a value median within the rank of acceleration signal; and means for subtracting the value median within the rank from the acceleration signal to provide the filtered acceleration signal.

9. A system in accordance with claim 8 wherein the means for determining an operating condition of the reciprocating engine comprises means for determining the reciprocating engine's speed.

10. A system in accordance with claim 8 wherein the means for determining an operating condition of the reciprocating engine comprises means for determining the reciprocating engine's load, and wherein the rank of the programmable median filter means is programmed dependent on the determined reciprocating engine's load.

11. A system in accordance with claim 10 wherein the rank of the programmable median filter means decreases as the determined reciprocating engine's load increases.

12. A system in accordance with claim 10 wherein the rank of the programmable median filter means increases as the determined reciprocating engine speed increases.

13. A system in accordance with claim 8 further comprising misfire determination means for receiving the filtered acceleration signal and for providing a misfire indication dependent thereon.

14. A system in accordance with claim 8 wherein the means for determining the powertrain operating condition comprises means for determining a gear selection of a transmission that is coupled to the reciprocating engine, and wherein the rank of the programmable median filtering means is dependent on the determined transmission gear selection.

15. A system in accordance with claim 14 wherein the rank of the median filtering means increases as the determined transmission gear selection corresponds to a higher gear ratio.

16. A system in accordance with claim 8 wherein the means for determining the powertrain operating condition comprises means for determining compliancy of coupling between the reciprocating engine an a transmission, and wherein the rank of the median filtering means is dependent on the determined compliancy of coupling between the reciprocating engine an a transmission.

17. A system in accordance with claim 16 wherein the rank of the median filtering means increases as the determined compliancy of coupling between the reciprocating engine and transmission decreases.

18. A system in accordance with claim 8 wherein the means for determining the powertrain operating condition comprises means for determining driveline resonant frequency and wherein the rank of the median filtering means is dependent on the determined driveline resonant frequency.

19. A system in accordance with claim 18 wherein the rank of the median filtering means decreases as the determined driveline resonant frequency increases.

20. An acceleration based misfire detection method with improved signal fidelity comprising the steps of:
providing an acceleration signal indicative of acceleration behavior of the reciprocating engine;
determining the reciprocating engine's load;
providing a filtered acceleration signal responsive to the acceleration signal provided by the step of providing an acceleration signal, wherein the filtered acceleration signal is provided dependent on the engine's load determined in the step of determining the reciprocating engine's load; and
receiving the filtered acceleration signal and for providing a misfire indication dependent thereon.

21. A method in accordance with claim 20 further comprising the step of:
determining the reciprocating engine's speed; and
wherein the step of providing a filtered acceleration signal, provides the filtered acceleration signal dependent on the reciprocating engine's speed determined in the step of determining the reciprocating engine's speed.

22. An acceleration based misfire detection method with improved signal fidelity comprising the steps of:
providing an acceleration signal indicative of acceleration behavior of the reciprocating engine;
determining an operating condition of the reciprocating engine; and
providing a median filtered acceleration signal responsive to the acceleration signal provided by the acceleration measurement means and having a rank dependent on the determined operating condition of the reciprocating engine.

23. A method in accordance with claim 22 wherein the step of determining an operating condition of the reciprocating engine comprises a step of determining the reciprocating engine's speed.

24. A system in accordance with claim 23 wherein the step of providing a median filtered acceleration signal comprises the steps of:
extracting a value median within the rank of acceleration signal; and
subtracting the value median within the rank from the acceleration signal to provide the filtered acceleration signal.

25. An acceleration based misfire detection system of a reciprocating engine with improved signal fidelity comprising:
acceleration measurement means for providing an acceleration signal indicative of acceleration behavior of the powertrain;
engine speed measurement means for providing an engine speed signal indicative of the reciprocating engine's speed;
order programmable lowpass filter for receiving the acceleration signal and for providing a lowpass filtered acceleration signal, wherein the order of the order programmable lowpass filter is programmed dependent on the reciprocating engine's speed determined by the engine speed measurement means;
programmable median filter means for receiving the lowpass filtered acceleration signal and for providing a improved fidelity median filmed acceleration signal, wherein the programmable, median filter has a rank dependent on the reciprocating engine's speed determined by the engine speed measurement means; and
misfire determination means for providing a misfire indication dependent on the improved fidelity median filtered acceleration signal.

26. A system in accordance with claim 25 further comprising means for determining the reciprocating engine's load, and wherein the rank of the median filtering means is dependent on the determined reciprocating engine's load.

27. A system in accordance with claim 26 wherein the rank of the programmable median filter means decreases as the determined reciprocating engine's load increases.

28. An acceleration based misfire detection system of a reciprocating engine with improved signal fidelity comprising:
acceleration measurement means for providing an acceleration signal indicative of acceleration behavior of the powertrain;
engine speed measurement means for providing an engine speed signal indicative of the reciprocating engine's speed;
order programmable lowpass filter means for receiving the acceleration signal and for providing a lowpass filtered acceleration signal, wherein the order of the order programmable lowpass filter is programmed dependent on the reciprocating engine's speed determined by the engine speed measurement means;

order programmable highpass filter means for receiving the lowpass filtered acceleration signal and for providing a highpass-lowpass filtered acceleration signal, wherein order of the order programmable highpass filter is dependent on the reciprocating engine's speed; and misfire determination means for providing a misfire indication dependent on the highpass-lowpass filtered acceleration signal.

29. An acceleration based misfire detection system of a reciprocating engine with improved signal fidelity comprising:

a speed sensor for determining a speed of the reciprocating engine;

an acceleration determination device coupled to the speed sensor for providing an acceleration signal indicative of torque behavior of the reciprocating engine;

a median filter having a rank dependent on the speed determined by the speed sensor, the median filter for providing a filtered acceleration signal responsive to the acceleration signal provided by the acceleration determination device; and misfire detector for providing a misfire indication dependent on the filtered acceleration signal.

30. A system in accordance with claim 29 further comprising reciprocating engine's load determination means, and wherein the rank of the median filter is further dependent on a reciprocating engine's load determined by the reciprocating engine'load determination means.

31. An acceleration based misfire detection system of a reciprocating engine with improved signal fidelity comprising:

an acceleration determination device coupled to the speed sensor for providing an acceleration signal indicative of torque behavior of the reciprocating engine;

a sensory system for determining an operating condition of the reciprocating engine;

a lowpass filter for receiving the acceleration signal and for providing a lowpass filtered acceleration signal, wherein the order of the order programmable lowpass filter is programmed dependent on the determined operating condition of the reciprocating engine;

a median filter having a rank dependent on the determined operating condition of the reciprocating engine, the median filter for providing a improved fidelity median filtered acceleration signal responsive to the lowpass filtered acceleration signal provided by the lowpass filter; and a misfire detector for providing a misfire indication dependent on the improved fidelity median filtered acceleration signal.

32. A system in accordance with claim 31 wherein the operating condition determined by the sensory system is engine speed.

33. A system in accordance with claim 31 wherein the operating condition determined by the sensory system is engine load.

34. An acceleration based misfire detection method comprising the steps of:

determining a first engine operating condition and providing an order selection;

determining a second engine operating condition and providing a rank selection;

providing a velocity signal indicative of torque behavior of a reciprocating engine;

providing a lowpass filtered velocity signal from a lowpass filter dependent on the velocity signal, wherein an order of the lowpass filter is dependent on the order selection provided in the step of determining a first engine operating condition;

providing an acceleration signal dependent on the lowpass filtered velocity signal;

providing a improved fidelity median filtered acceleration signal from a median filter dependent on the acceleration signal, wherein a rank of the median filter is dependent on the rank selection provided in the step of determining a second engine operating condition;

providing a misfire indication dependent on the improved fidelity median filtered acceleration signal.

35. A method in accordance with claim 34 wherein the steps of determining a first engine operating condition and determining a second engine operating condition both comprise a step of determining engine speed.

36. A method in accordance with claim 34 wherein the steps of determining a first engine operating condition and determining a second engine operating condition both comprise a step of determining engine load.

37. An acceleration based misfire detection system comprising:

means for determining a first engine operating condition and providing an order selection;

means for determining a second engine operating condition and providing a rank selection;

means for providing a velocity signal indicative of torque behavior of a reciprocating engine;

means for providing a lowpass filtered velocity signal from a lowpass filter dependent on the velocity signal, wherein an order of the lowpass filter is dependent on the order selection provided in the step of determining a first engine operating condition;

means for providing an acceleration signal dependent on the lowpass filtered velocity signal;

means for providing a improved fidelity median filtered acceleration signal from a median filter dependent on the acceleration signal, wherein a rank of the median filter is dependent on the rank selection provided in the step of determining a second engine operating condition; and means for providing a misfire indication dependent on the improved fidelity median filtered acceleration signal.

* * * * *

UNITED STATES PATENT AND TRADEMARK OFFICE
CERTIFICATE OF CORRECTION

PATENT NO. : 5,515,720
DATED : 5/14/96
INVENTOR(S) : Remboski et al.

It is certified that error appears in the above-indentified patent and that said Letters Patent is hereby corrected as shown below:

In Claim 25, col. 12, line 42, "filmed" should be --filtered--.

In Claim 25, col. 12, line 43, "," should be omitted.

In Claim 30, col. 13, line 34, "engine'load" should be --engine's load--.

Signed and Sealed this

Eighteenth Day of February, 1997

Attest:

BRUCE LEHMAN

Attesting Officer     Commissioner of Patents and Trademarks